P. G. E. DANIEL & C. A. H. BULLOCK.
APPARATUS FOR CUTTING PAPER, &c.
APPLICATION FILED AUG. 19, 1908.
940,862. Patented Nov. 23, 1909.
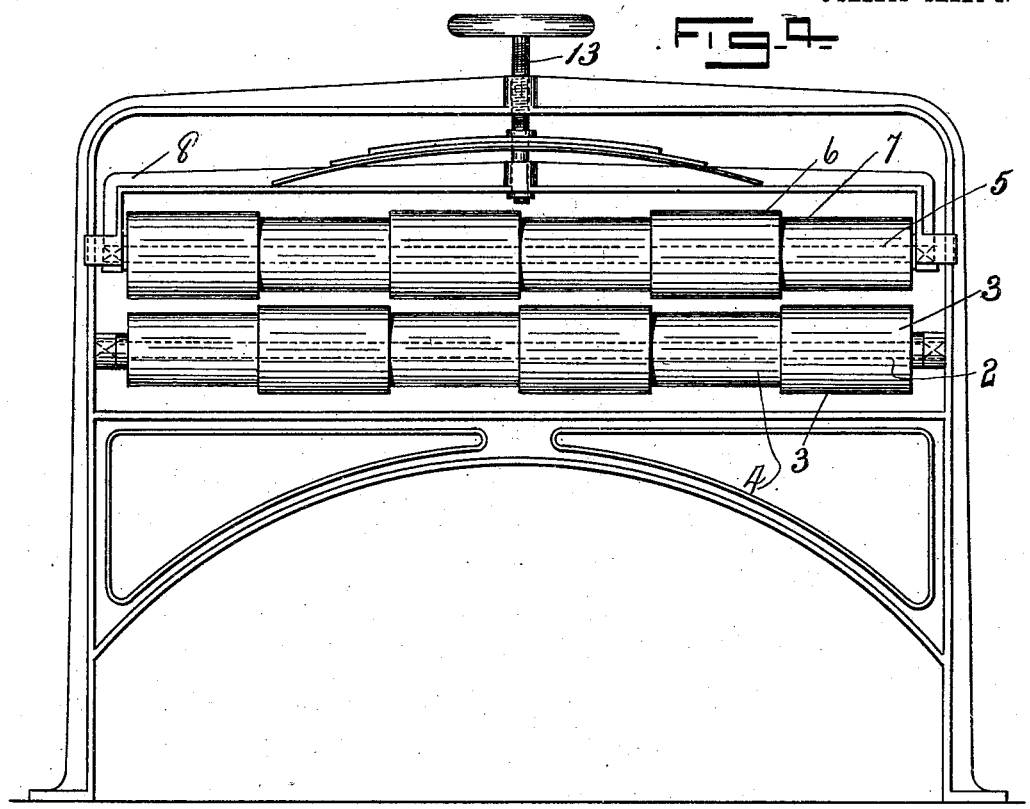
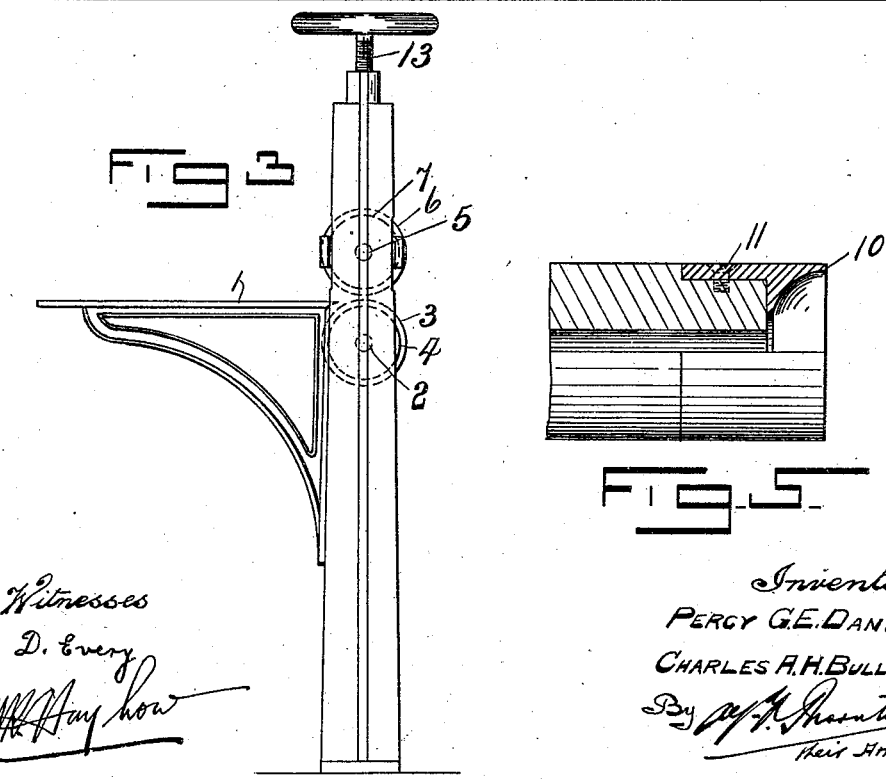
Inventors
PERCY G.E. DANIEL
CHARLES A.H. BULLOCK P. G. E. DANIEL & C. A. H. BULLOCK.
APPARATUS FOR CUTTING PAPER, &c.
APPLICATION FILED AUG. 19, 1908.
940,862.
Patented Nov. 23, 1909.
3 SHEETS—SHEET 3.
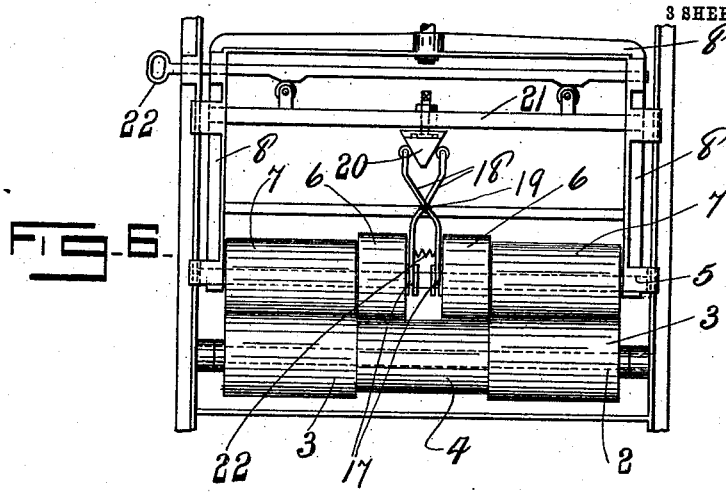
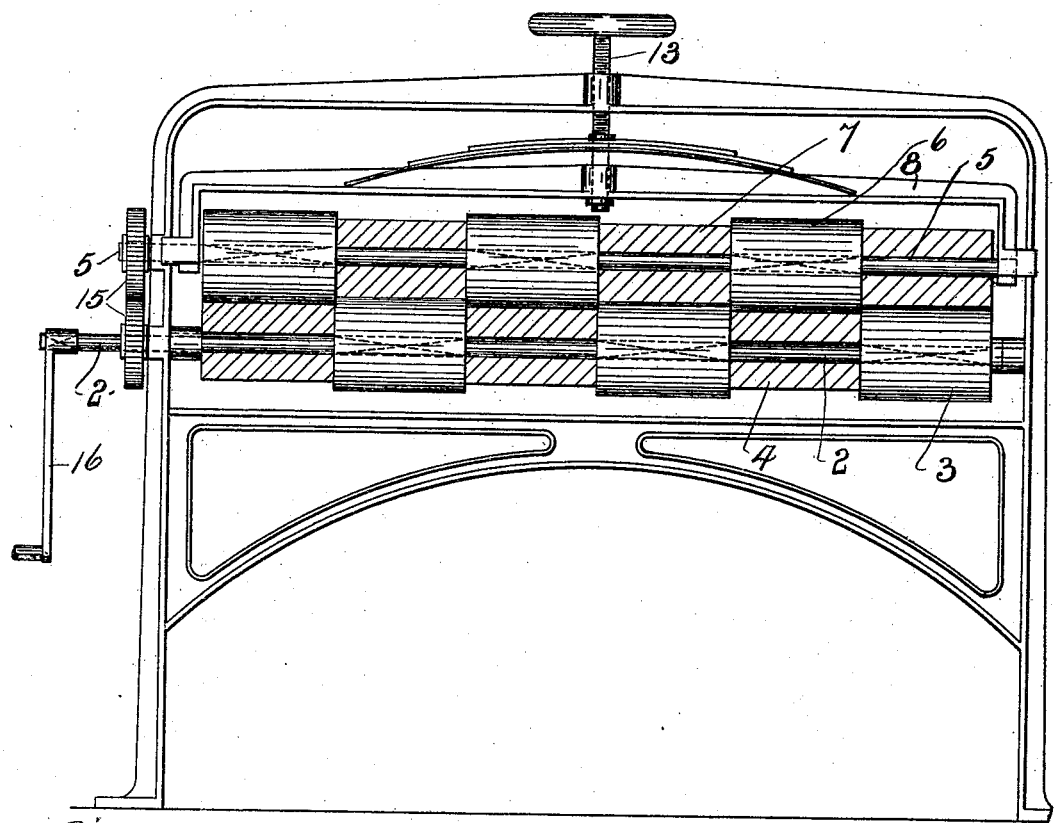

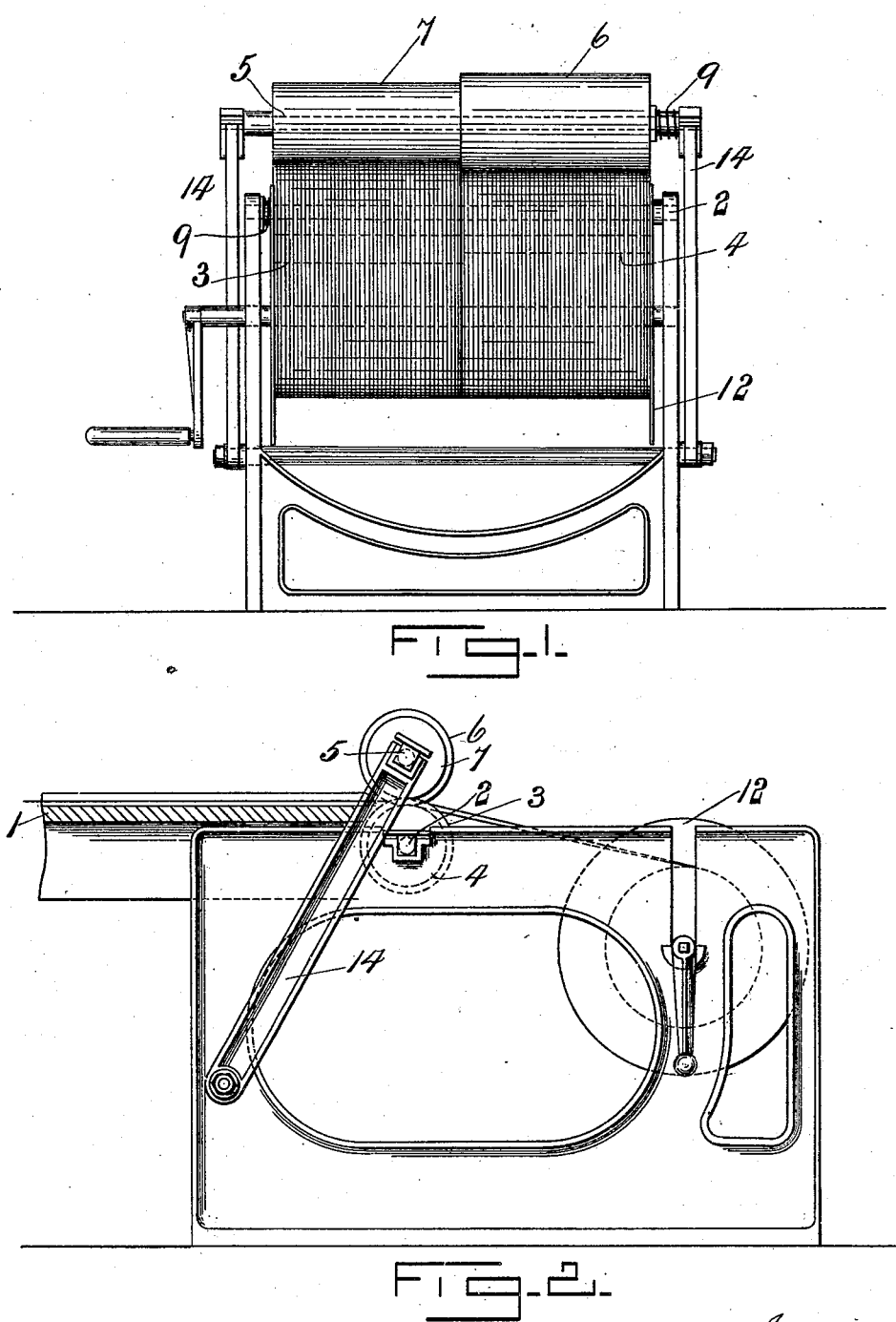

UNITED STATES PATENT OFFICE.

PERCY GORDON ECKERSLEY DANIEL, OF CLEVEDON, AND CHARLES ASHTON HENRY BULLOCK, OF LONDON, ENGLAND.

APPARATUS FOR CUTTING PAPER, &c.

940,862.     Specification of Letters Patent.     Patented Nov. 23, 1909.

Application filed August 19, 1908. Serial No. 449,268.

*To all whom it may concern:*

Be it known that we, PERCY GORDON ECKERSLEY DANIEL and CHARLES ASHTON HENRY BULLOCK, subjects of the King of Great Britain, residing the first-named at Clevedon, in the county of Somerset, England, and the second-named at London, in the county of London, England, have invented new and useful Improvements in Apparatus for Cutting Paper and other Materials, of which the following is a specification.

This invention relates to apparatus for cutting paper, cardboard and other sheet material, and has for its object to provide novel and effective means whereby paper or the like can be cut into any desired predetermined width or widths as it is drawn in continuous lengths or otherwise through the apparatus.

Our invention is specially applicable, among other things, to cutting the paper webs used in newspaper and other printing into lesser widths and to cutting sheets of stamps into strips.

Our invention broadly consists of a plurality of cutting rollers arranged in pairs one above the other and revolubly mounted on spindles. Each pair or series of cutting rollers aforesaid is mounted on an independent spindle, while each roller is arranged to revolve independently of the others. One of the rollers in each pair is of somewhat greater diameter than the other, while their opposing ends are in close frictional contact one with the other. One of the pairs or series of rollers aforesaid (preferably the upper pair) has its spindle mounted in a movable framework so that such pair or series of rollers can be moved into position to contact with the second pair or series of rollers or away from the latter, for the purposes hereinafter referred to. Each pair or series of cutting rollers is so arranged on its spindle that the roller or rollers of larger diameter in one pair or series is or are to the right hand side of the smaller roller or rollers of such pair or series, while the other larger roller or rollers of the other pair or series is in a vice-versa position, in relation to its smaller fellow or fellows, the cutting or tearing edge of each of such larger rollers of the one pair or series slightly overlapping the larger roller of the other pair or series associated with it and being in close frictional contact. And in order that this our said invention may be more readily understood and carried into practical effect reference is hereby made to the accompanying sheet of illustrative drawings wherein:—

Figure 1 is a front elevational view of a simple apparatus embodying the essential features of our invention with the rollers shown in their operative positions, Fig. 2 is a side elevational view thereof, Fig. 3 is a side elevational view of a larger type of machine constructed in accordance with our invention the cutting rollers being shown in position to receive the material to be cut, Fig. 4 is a front elevational view thereof, Figs. 5 and 6 are views illustrating details of construction or the cutting rollers, while Fig. 7 is a view illustrating a slight modification of our invention.

Referring to these drawings wherein like numerals of reference indicate corresponding parts wherever occurring through all the figures the numeral 1 designates a bed or guide along which the material to be cut passes. At the front of this bed or guide 1 we mount a spindle 2 which spindle 2 is non-rotatable and has loosely mounted upon it a plurality of independently rotatable rollers 3 and 4, the rollers 3 being essentially of somewhat greater diameter than the rollers 4. Arranged upon a rigid spindle 5 parallel with the spindle 2 we provide the independently rotatable rollers 6 and 7 the rollers 6 being of the same diameter as the rollers 3 while the rollers 7 are of the same diameter as the rollers 4. The spindle 5 carrying as aforesaid the rollers 6 and 7 is carried by a movable framework or support 8 so that the rollers 6 and 7 can be moved into and out of engagement with the rollers 3 and 4.

It will be readily seen on reference to the drawings that the large rollers 3 of the one pair or series are arranged to mesh with the smaller rollers 7 of the other pair or series, while the smaller rollers 4 of the one series similarly mesh with the larger rollers 6 of the other series. By this means the opposing ends of the large rollers 3 and 6 overlap each other slightly and are arranged in close frictional contact to form a cutting or tearing edge or cutting or tearing edges. In order to maintain the frictional contact between the opposing ends of the rollers 3 and 6 we provide compression springs 9 which also serve to compensate for any wear upon these opposing ends while furthermore in order to obviate any difficulty which may be occasioned by wear upon these parts we may provide the rollers 3 and 6 with removable end members 10 and these removable members 10 may take the form of rings as shown in Fig. 5 adapted to be held in place upon reduced portions of the rollers by means of set screws 11, the heads of which lie in countersinkings in the said rings 10.

In operation the movable framework or support 8 is raised and the material to be cut arranged between the rollers 6 and 7 carried by this framework and the rollers 3 and 4 of immovable location. The rollers 6 and 7 are then allowed to engage upon the rollers 3 and 4 with the material to be cut between the upper and lower series of rollers. If the material is then drawn through the rollers it will be found that a clean incision—or clean incisions as the case may be—is made in the material and such material can be wound upon storage spools such as 12 in a plurality of strips. The degree with which the upper movable rollers 6 and 7 "bite" or engage upon the material between them and the rollers 3 and 4 may in some cases require to be adjusted and for this reason we may provide adjusting devices such for instance as the screw 13, Figs. 3 and 4, but in the case of comparatively easily divided material such as paper it will be found that if the upper series of rollers 6 and 7 are carried upon a pivoted support such as 14, the weight of the rollers will themselves cause sufficient "bite" while it will be readily seen that if the framework or support 14 is pivoted to the bed or guide 1 in the manner shown in Fig. 1 the drawing through of the material will itself tend to increase the degree of "bite".

It will be understood that where it is desired merely to provide for the dividing of the material into two strips, pairs of rollers are employed to form one cutting or tearing edge while if the material is to be cut into more than two strips the number of rollers employed must be increased so as to give the additional cutting or tearing edges required. It will also be clear that the widths of the strip or strips into which the material is cut depends upon the widths of the rollers employed so that in one machine provision can be made for cutting strips of varying width within the limits of the machine by providing rollers of various widths. The rollers are preferably made of hardened steel although of course we do not limit ourselves to this material but may employ any others either alone or together as may be found desirable or convenient. For instance it may be found in practice that it is desirable to form some rollers of one material and some of another.

It will be understood from the foregoing that any desired length of material can be cut in a continuous manner by means of our invention, while by duplicating to any desired extent the sets or pairs of cutting rollers before described any desired or convenient number of parallel incisions may be made simultaneously. The said rollers may, if it be found desirable and convenient in practice, be combined with the calendering rollers at present employed in paper-making plants. In lieu of having all the rollers revolubly mounted on fixed spindles it is clear that certain of the said rollers, may, if desirable revolve with their spindles the essential condition being that the rollers are rotatable independently of each other.

In Fig. 7 we have shown a form of device wherein the rollers also serve to feed the material being cut. In this case the larger rollers 3 and 6 are fixed upon the spindles 2 and 5 respectively and the spindles 2 and 5 are extended to take gear wheels or pinions 15, a handle 16 or its equivalent being provided to enable the spindles 2 and 5 to be rotated. Where more than two rollers are mounted on each of the spindles 2 and 5 we insure close frictional contact between the overlapping edges of the larger rollers 3 and 6 by dividing one or more of such larger rollers in the center as shown in Fig. 6. When the machine is in operation the two parts of the divided roller are forced outward by the lower ends 17 of arms 18 pivoted upon the same pivot or spindle 19 the upper ends of said arms being forced apart by means of an adjustable wedge or adjustable wedges 20. The wedge or wedges 20 being preferably carried by a vertically movable bar 21. When it is desired to raise the upper rollers for the purpose of inserting the paper or other material to be cut the bar 21 is first raised and this carries the wedge or wedges 20 out of operation and the tension spring 22 tends to draw the lower ends 17 of the arms 18 and consequently two parts of the divided roller together but when the rollers are again engaged for operation and the bar 21 is depressed by the operation of the lever 22 it will readily be seen that the overlapping ends of the larger rollers will be caused to have close frictional contact.

What we claim as our invention and desire to secure by Letters Patent is:—

1. In cutting apparatus the combination with one pair of separately rotatable rollers each roller of the pair being of a different diameter, of a second pair of similar rotatable rollers capable of frictionally meshing with the first pair so that the inner end of the larger roller of the one pair overlaps and frictionally contacts with the inner end of the larger roller of the other pair to form a cutting edge, shafts for said rollers, and means for non-rotatively securing one roller of each pair to its shaft, substantially as specified.

2. In cutting apparatus the combination with a plurality of independently rotatable rollers of different diameters and fixed location, of a plurality of similar rotatable rollers of similarly different diameters arranged parallel with the rollers of fixed location the large rollers of the one series being capable of frictional contact with the smaller rollers of the other series so that the ends of the larger rollers of the one series partially overlap the opposing ends of the larger rollers of the other series to form dividing edges, shafts for said rollers, and means for non-rotatively securing one roller of each pair to its shaft, the companion roller of each pair being loosely mounted substantially as specified.

3. In cutting apparatus the combination with a non-rotatable spindle of rollers of two different diameters arranged to be capable of rotation side by side upon said spindle, the rollers of one diameter alternating with rollers of another diameter, a second non-rotatable spindle arranged parallel with the first spindle, a movable framework, carrying said second spindle, and a second series of rotatable rollers of two different diameters carried by this spindle the rollers of one diameter alternating with the rollers of the other diameter said frame-work being mounted to swing by gravity to bring its set of rollers into engagement with the companion set of rollers.

4. In cutting apparatus the combination with one pair of separately rotatable rollers each roller of the pair being of a different diameter and a second pair of similar rotatable rollers, of a movable framework carrying said second pair of rollers, by the movement of which framework the two pairs of rollers can be engaged by gravity substantially as specified.

In testimony whereof we have signed our names to this specification in the presence of two subscribing witnesses.

PERCY GORDON ECKERSLEY DANIEL.
CHARLES ASHTON HENRY BULLOCK.

Witnesses:
H. D. JAMESON,
F. L. RAND.